Jan. 28, 1941.   H. E. CLARKE   2,230,133
AUTOMATIC CLUTCH CONTROL MECHANISM
Original Filed May 25, 1935   4 Sheets-Sheet 1
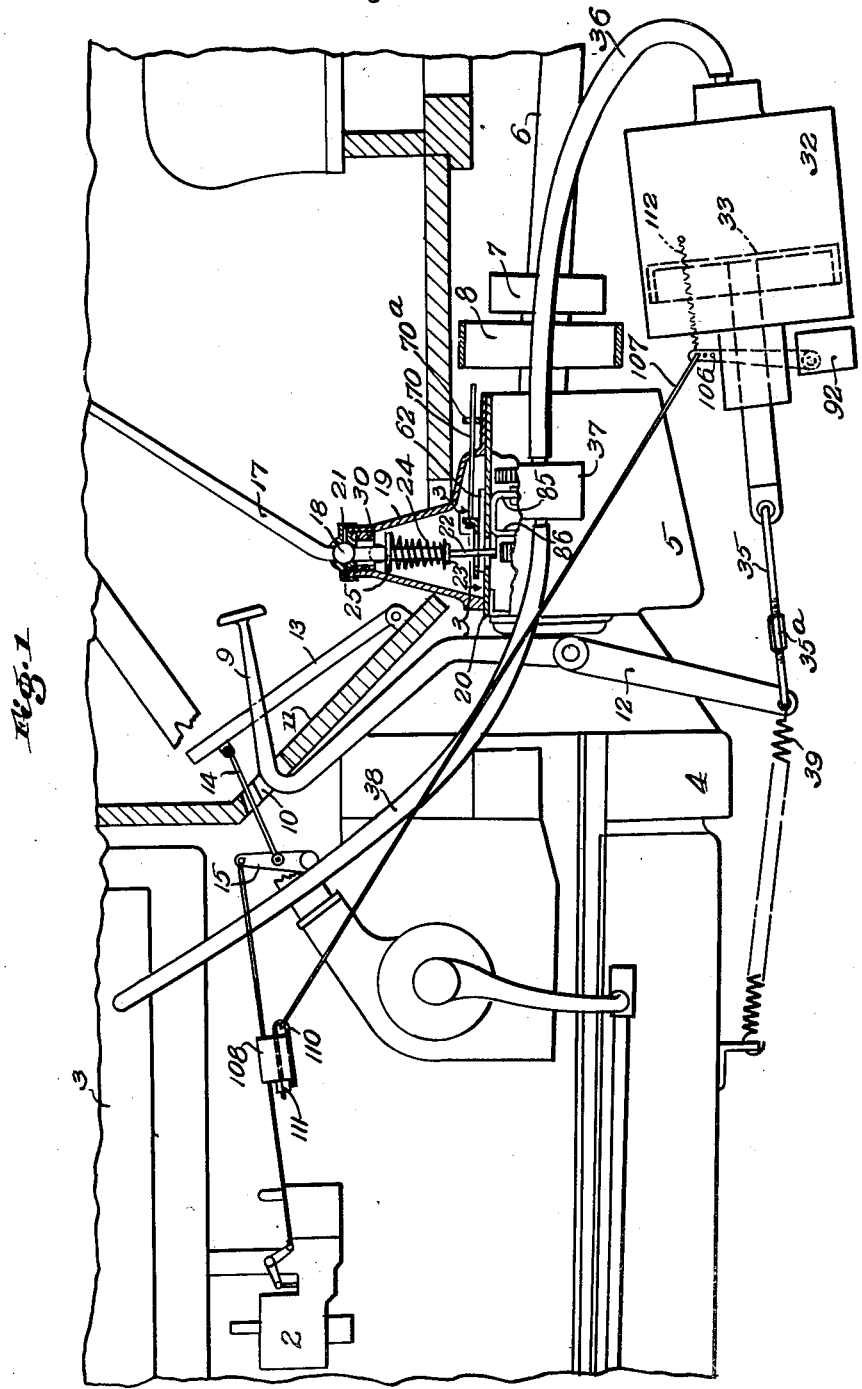
Inventor
Harold E. Clarke
By Thompson & Thompson
his Attys.

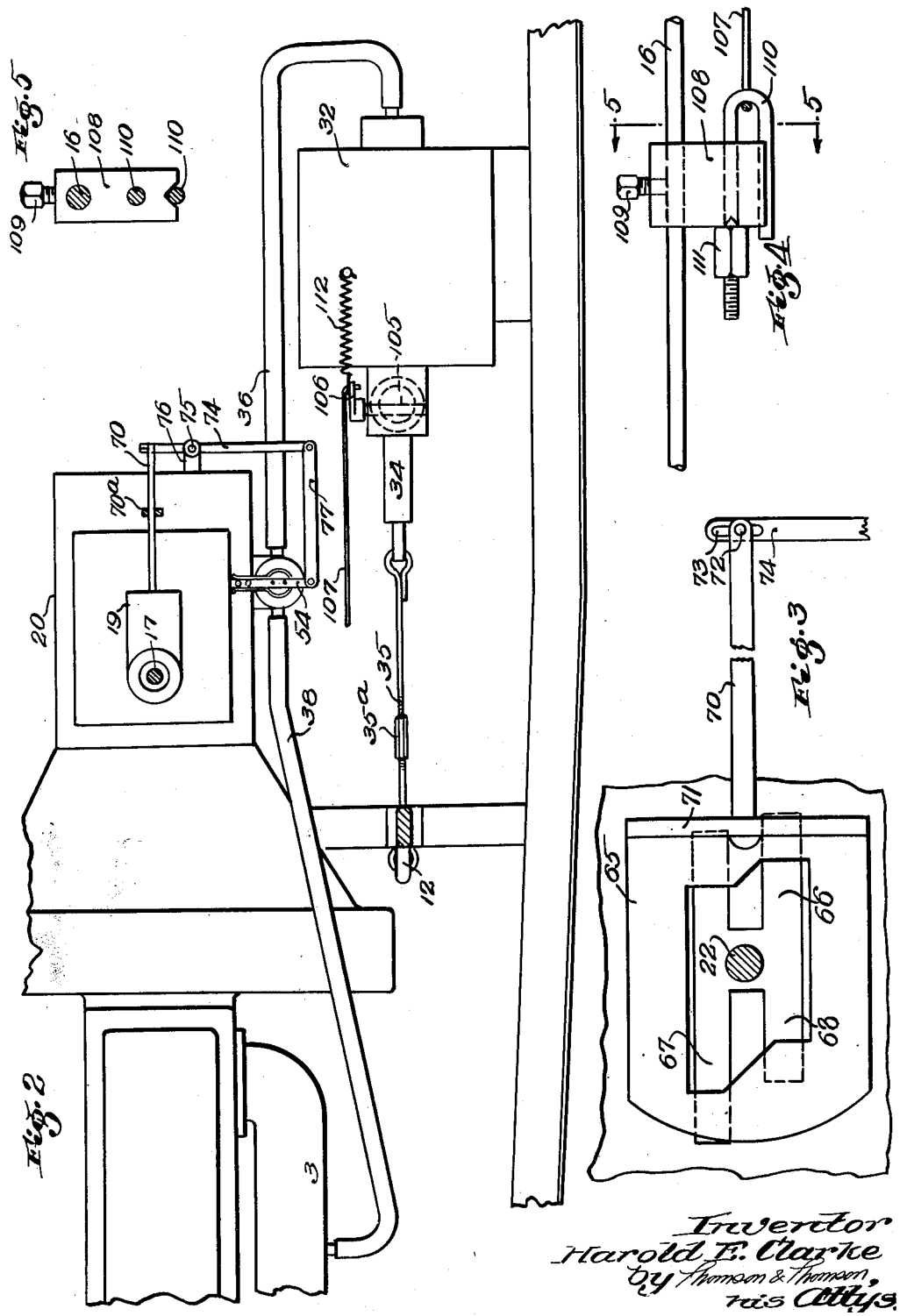

Jan. 28, 1941.  H. E. CLARKE  2,230,133
AUTOMATIC CLUTCH CONTROL MECHANISM
Original Filed May 25, 1935  4 Sheets-Sheet 3
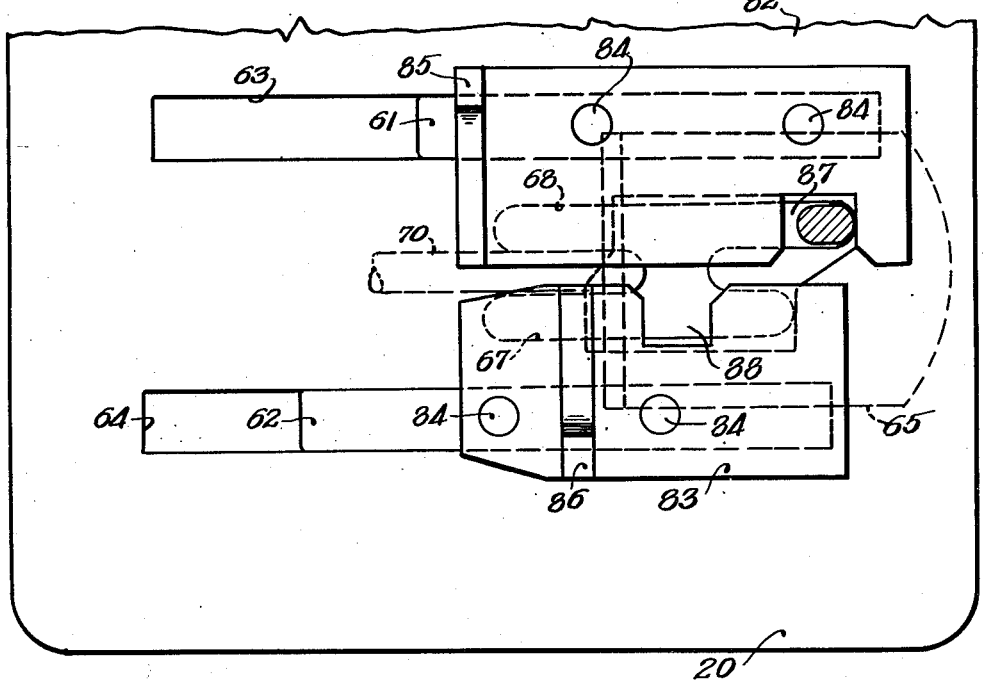
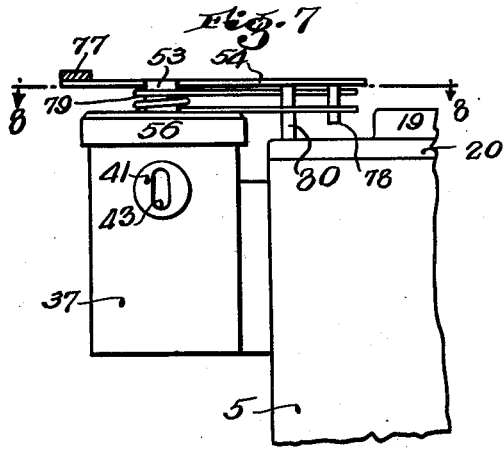
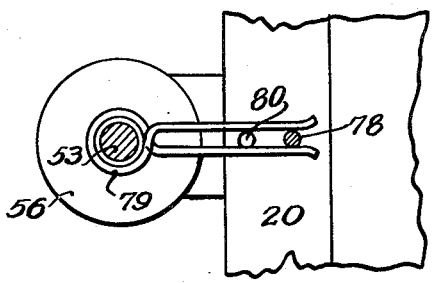
Inventor
Harold E. Clarke
by Thomson & Thomson
his Attys.

Jan. 28, 1941. H. E. CLARKE 2,230,133
AUTOMATIC CLUTCH CONTROL MECHANISM
Original Filed May 25, 1935 4 Sheets-Sheet 4
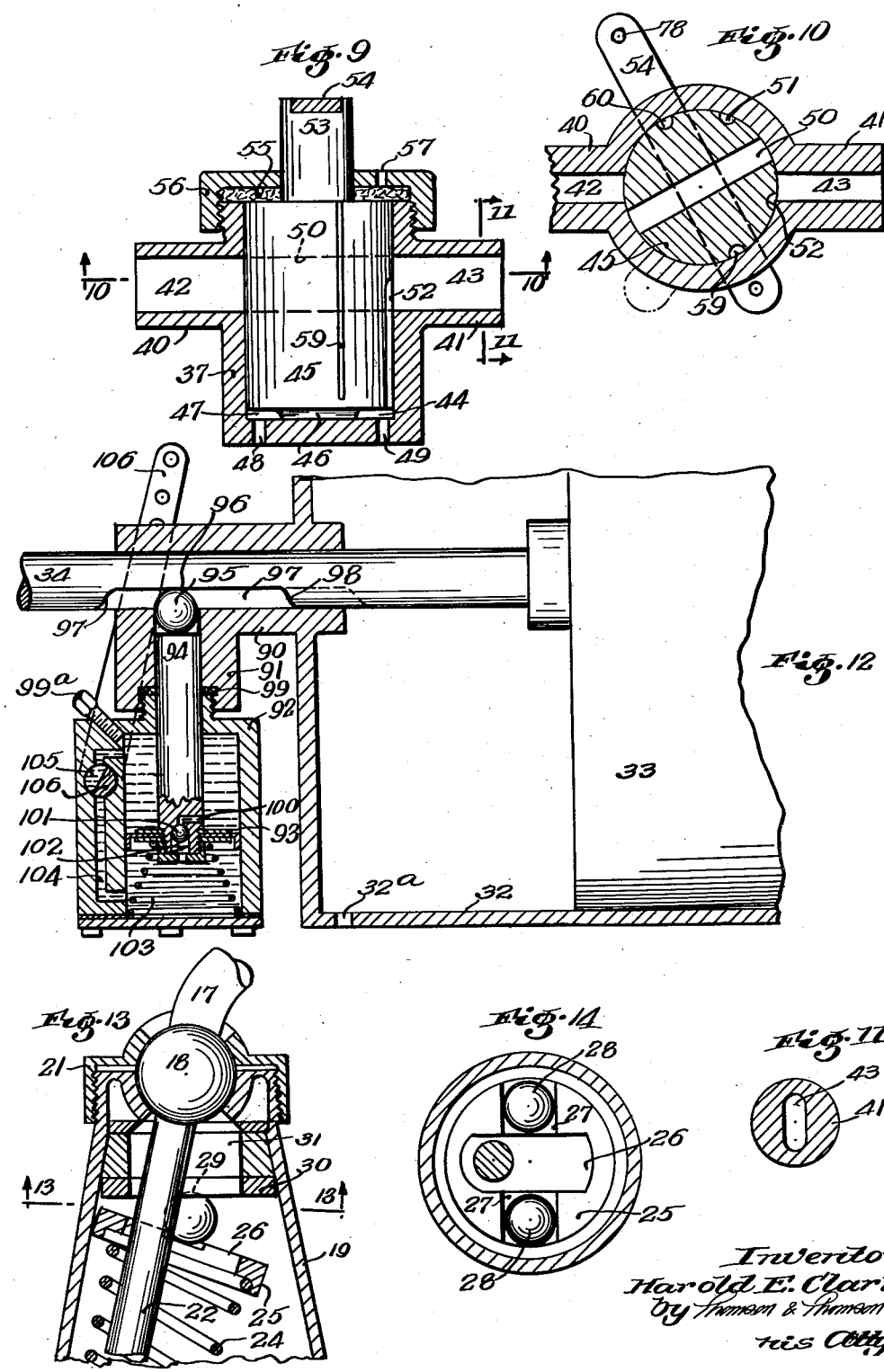

Patented Jan. 28, 1941

2,230,133

UNITED STATES PATENT OFFICE 2,230,133

AUTOMATIC CLUTCH CONTROL MECHANISM

Harold E. Clarke, West Somerville, Mass.

Original application May 25, 1935, Serial No. 23,428. Divided and this application September 17, 1938, Serial No. 230,453

6 Claims. (Cl. 192—3.5)

This invention relates to improvements in automatic clutch control mechanism, particularly in which the clutch is engaged and disengaged automatically through movement of the gear shifting lever and is a division of my prior application Serial #23,428, filed May 25, 1935, now Patent No. 2,132,721, issued October 11, 1938.

It is an object of my invention to provide means for automatically controlling a power operated clutch through the normal movement of the gear shifting lever in which the clutch is disengaged when the gear shift lever is in neutral position and is automatically engaged when the lever is moved to bring the gears into mesh.

My invention may be best understood by reference to the accompanying drawings in which Fig. 1 is a side view of a part of an automobile showing rearward portion of the motor, the clutch housing, transmission, drive shaft and the vacuum clutch control device. The upper part of the transmission casing is shown broken away to disclose, partly in vertical section a part of my means for controlling the clutch by movement of the gear-shifting lever; and the steering post has been shown partly broken away, and the front floor board in vertical section, to disclose the carburetor control means.

Fig. 2 is a plan view showing the top of the motor and transmission casing, the vacuum actuated clutch disengaging means, the valve for controlling the same and the arrangement of valve actuating rods or arms.

Fig. 3 is an enlarged top view of the slidably mounted valve control plate and attached parts, with the gear-shifting lever shown in horizontal cross-section in the neutral position in the cross-over channel of the underlying grid plate, as viewed in line 3—3 of Fig. 1.

Fig. 4 is an enlarged side view of the adjusting means for controlling the valve which controls the limits of return of the vacuum-actuated clutch disengaging means.

Fig. 5 is a section on line 5—5 of Fig. 4.

Fig. 6 is an enlarged bottom view of the grid plate in the top of the transmission casing, inverted and showing the slidable members provided with dogs for moving the gears, and means for mounting the same as in standard practice, the parts being positioned as when the transmission is in first gear, and showing also, in dotted lines, overlying the grid plate, my slidably mounted valve-control plate illustrated in Fig. 3.

Fig. 7 is an enlarged rear view of the valve which controls generally the vacuum actuated clutch disengaging means, showing the valve actuating arm and the adjacent part of the transmission casing and the spring which controls the normal position of the valve.

Fig. 8 is a top view on the line 8—8 Fig. 7.

Fig. 9 is a side view of the valve shown in Fig. 7 the casing being shown in medial vertical section revealing the cylindrical rotary valve.

Fig. 10 is a section on line 10—10 of Fig. 9, showing, as does Fig. 9, the valve in position to admit atmospheric pressure to the vacuum chamber of the vacuum-actuated clutch disengaging means.

Fig. 11 is a cross-section on line 11—11 of Fig. 10 showing the narrow vertically elongated passage of the valve.

Fig. 12 is an enlarged side view of the front end of the vacuum-actuated cylinder and piston means for disengaging the clutch, showing the piston and rod and control means engaging the same for regulating the return of the piston to permit clutch engagement, said control means and the front end of said cylinder being shown in medial vertical cross-section.

Fig. 13 shows an enlarged medial vertical cross-section of the elevated extension of the cover-plate of the transmission casing, carrying the conventional ball-socket joint for the gear shifting lever therein shown with my specially mounted coil spring thereon arranged yieldingly to hold the gear shifting lever in its extreme forward or rearward positions notwithstanding counter influence to which the lever is subjected by other elements of my device.

Fig. 14 is a cross-sectional view on line 13—13 of Fig. 12 showing the movable backing-plate for the coil spring shown in Fig. 12 and the balls carried thereon.

Referring now more specifically to the drawings 1 is the motor, provided with a carburetor 2 and intake manifold 3. 4 is the clutch housing, 5 the transmission casing and 6 the drive shaft provided with a universal joint 7 and the usual parking brake assemblage 8. The conventional clutch pedal arm 9 extends freely through a slot 10 in the front floor-board 11 and is provided with an extension arm 12. The accelerator pedal 13, hinged at its base to the front floor-board 11 is provided, on the under side of its top portion, with a pivotally mounted push rod 14 which is pivotally attached to an oscillating arm 15 to which is pivotally attached, at the top thereof, the throttle valve control rod 16, the forward movement of which, upon the depression of the accelerator pedal 13, opens the throttle of the carburetor 2 and accelerates the motor 1.

The conventional gear-shifting lever 17 carries a ball member 18 which is loosely embraced by the ball-socket housing formed by the top of the cover extension 19 of the gear-case cover 20 and the screw-cap 21 (see Fig. 13). The lower arm 22 of the gear-shifting lever 17 carries a flanged collar 23 (see Fig. 1), against which abuts the lower end of a tapering coil spring 24, the upper end of which abuts against a slotted circular plate 25 (see Figs. 13 and 14), through the slot 26 of which the lower arm 22 of the gear-shifting lever 17 loosely passes. The top face of the plate 25 is channeled by a groove 27 upon its diameter at right angles to the slot 26, on each side of which is mounted a ball 28, the top of which is retained in a slight cavity or pocket 29 in the under face of a member 30, fixed within the top of the cover extension 19 and provided with an enlarged opening 31 within which the lower arm 22 of the gear-shifting lever 17 may swing freely. The coil spring 24 is under considerable compression so as to keep the balls 28 within their respective sockets 29 notwithstanding the tilting of the plate 25 as the angular position of the lower arm 22 is changed in the process of gear-shifting. Since the axis of the spring, and consequently the direction of its force, assumes an angular relation to the axis of the arm 22 whenever the gear-shifting lever 17 is moved from the neutral position, it is to be noted that the force of the spring has a tendency to move the gear-shifting lever 17 toward the extreme of either its forward or backward position from neutral as the case may be when the operator is engaging a certain gear. The purpose of this function I will hereinafter explain.

To effect control of the clutch through the action of shifting or positioning the gear-shifting lever I have shown, and preferably employ, a vacuum-actuated cylinder 32, provided with an atmospheric port 32² which may be attached to the side-frame of the car, as in Fig. 2, or elsewhere, and which contains a piston 33, the piston rod 34 of which is connected by the length-adjustable, rigid link 35 to the lower end of the extension arm 12 of the clutch control pedal arm 9. The back end of the cylinder 32 is connected, in the conventional manner, by a pipe 36 to a control valve means 37 which in turn is connected, by a pipe 38, with the intake manifold 3. It will be readily understood, therefore, that when the valve means 37 is so set as to subject the back part of the cylinder 32 to the influence of the partial vacuum of the intake manifold 3 the piston 33 will be retracted causing the extension arm 12 of the clutch pedal arm 9 to be oscillated backward against the yielding influence of the spring 39 thereby releasing the clutch, which may be permitted to return to operative engagement under the influence of the spring when the partial vacuum in the cylinder 32 is relieved by changing the position of the valve within the valve means 37 so as to admit atmospheric pressure to the chamber of the cylinder 32 back of the piston 33.

Such clutch control means as above described and broadly viewed, are now well-known widely in use, and I shall now proceed to describe (firstly) my improved valve means, (secondly) the mechanism for operating the same through manipulation of the gear shifting lever and (thirdly) my means for controlling the return of the clutch into operative engagement after being disengaged.

The valve means comprises the cylindrical casing 37 provided with opposite integral pipe connections 40 and 41 for carrying respectively the pipe 38 to the intake manifold 3, and the pipe 36 to the rear of the cylinder 32. These pipe connections 40 and 41 are provided respectively with passages 42 and 43. Within the cylindrical bore 44 of the casing of valve means 37 there is a closely fitting rotatable, cylindrical valve 45 which carries on its lower end a centrally located extension 46 of lesser diameter than the valve 45, so that there is an annular space 47 beneath the valve 45, which space communicates with the outer atmosphere through ports 48 and 49.

The valve 45 is provided with a transverse passage, or port 50 which may register with the passages 42 and 43, and its cylindrical periphery is provided with two grooves or channels 51 and 52 which are located adjacent to and on either side of the end of the passage 50 which may register with the passage 43. These grooves 51 and 52 extend from the base of the valve 45 to a point sufficiently high to permit them to register with the passage 43 and thus admit atmospheric air to the passage and then to the back of the cylinder 32 whenever one of them is caused to register with that passage upon the turning of the valve 45. It will be noted from Fig. 11 that the passage 43 is elongated vertically and straight sided, rather than round so that the groove 51 or 52 may register therewith to a considerable extent quickly as said grooves are being moved into registration therewith.

The top of the valve 45 is substantially flush with the top of the casing of the valve means 37, and carried an integral central post 53 provided with a transversely mounted valve operating arm 54, which is located at right angles to the passage 50. Overlying the top of the valve 45 is a felt washer 55 which is held in place by the screw cap 56 which is screwed upon the threaded top of said valve casing. The cap 56 is provided with an oil hole 57 through which oil may be supplied to the felt washer 55 from which it may seep down along the cylindrical faces of the inside of said valve casing, and the outside of the valve 45, which is provided with grooves 59 and 60 to assist in this distribution of the oil.

To operate the valve 45 incidentally to the operation of the gear shifting lever 17, I have provided the following described structures: Slidably supported above the conventional slides 61 and 62, which are supported by the top of the cover plate 20 on the upper part of the transmission casing 5, and guided by slots 63 and 64 therein respectively, (see Figs. 3 and 6), I have provided a plate 65. The plate 65 has an aperture through which passes the lower arm 22 of the gear-shifting lever 17. It will be noted from an examination of Figs. 3 and 6 of the drawings that the opening 66 of the plate 65 is of irregular contour, its sides being parallel and its front and rear edges having staggered portions, extending at right angles to the sides, so as to extend at right angles across the longitudinal parallel slots 67 and 68 of the H shaped grid opening of the cover plate 20, which, by contact with the lower end of its arm 22 which passes through it, guides and limits the movement of the gear shifting lever 17. When the plate 65 is in the position in which it rests when the gear shifting lever arm 22 is in the neutral position, as shown in Fig. 3, which position it then assumes automatically because of means which I shall hereinafter describe, it will be noted that the front edge overlies the longitudinal parallel slots 67 and 68 slightly to the rear of their front ends, and that the rear edge overlies said slots at substantially the same distance from rear ends of said slots. The result of the foregoing arrangement of parts is that when the arm 22 of the gear shifting lever 17 is moved, by oscillation, forwardly through the slots 67 and 68 to engage respectively the first and third speed gears, in the manner of standard practice, there is a slight forward displacement of the sliding plate 65 when it is engaged by arm 22, whereas when the said arm is moved backward through said slots, to effect the engagement of the reverse and second speed gears, there is affected substantially the same rearward displacement of the plate 65.

The plate 65 is operatively connected to the valve 45 by means of the rod 70 attached to the upturned flange 71 on the rear edge of said plate. A bracket 70a attached to the cover extension 19, forms a support for the slidable rod 70 and its attached plate 65. The rod 70 carries at its rearward end a pin 72 which loosely enters a slot 73 in one end of the lever arm 74 which is pivoted on pivot 75 on the bracket 76 attached to the back of the transmission casing 5. The other end of lever arm 74 is pivotally connected to one end of the arm 77, the opposite end of which is pivotally connected to the rear end of the control arm 54 of the valve 45.

The opposite end of the control arm 54 is provided with a dependent pin 78 (see Figs. 7 and 8) against which bears, on opposite sides thereof, the straight, extended ends of a coil spring 79 which embraces the top of the post 53. Between the ends of the coil spring 56 is a second pin 80 which is fixed in an upright position on the top of the gear case cover-plate 20. The tension of the spring 79 is such that its extended ends tend to bear against the pin 80 although either end may be forced outwardly from the pin 80 through the movement of the pin 78 as the arm 54 is oscillated when the arm 22 of the gear shift lever, approaching an extreme of its oscillating movement within either of the slots 67 and 68, contacts with and moves the sliding plate 65. When however the parts are in the position shown in Figs. 7 and 8 the plate 65 is yieldably retained in the neutral position shown in Fig. 3, in which position the valve 45 is so set that the valve passage 50 registers with the passages 42 and 43, thus subjecting the cylinder 32 to the influence of the partial vacuum of the intake manifold 3 so as to withdraw the clutch from engagement and hold it out of engagement. When however the plate 65 has been moved into either an extreme forward or extreme backward position, by placing the car "in gear" through moving the gear-shifting lever arm 22 into engagement with an end of one of the slots 67 and 68, a slight change of angular position of the valve 45 takes place thereby bringing either the passage 52, or the passage 51, as the case may be, into registration with the passage 43, thereby relieving the partial vacuum behind the piston 33 in the cylinder 32, so as to allow the clutch to return to operative position under the influence of the spring 39. It will be readily understood therefore that in the course of operation of the automobile, and incidentally to changing gears, the clutch is withdrawn from engagement in an automatic manner without need for the operator to perform this necessary operation by pressing down the clutch pedal.

In order to make disengagement of the clutch possible through use of the gear-shifting lever, so as wholly to eliminate the need of recourse of the clutch pedal, I have provided for a slight degree of freedom of movement of the gear-shifting lever, when it is in any gear meshing position, so that it may be moved slightly toward the neutral position without having any effect to disengage the transmission gears then in mesh as a result of having moved the lever from the limit of its oscillation permitted by an end of either of slots 67 or 68. This I have done by providing that within the sliding plates 82 and 83 (see Fig. 6) which are fastened by rivets 84 to the under sides of the slide members 61 and 62 respectively and provided respectively with dependent dogs 85 and 86, adapted to enter channels in the hubs of those transmission gears which they are designed to shift (according to standard and conventional practice), the recesses 87 and 88, wherein may be entered the arm 22 of the gear shifting lever 17 to effect movement of these plates, shall be of sufficient width to permit some slight free movement of the arm 22, from the limit of a gear meshed position toward the neutral position, without sliding the plate 82 or 83 with which it is in operative relationship, so as to move the gear controlled by its movement. This free movement, however, is sufficient to permit the plate 65, which under the influence of the spring 79 always tends to follow the arm 22 in the direction of neutral position, to move sufficiently to cause the valve passage 50 to register with ports 42 and 43, thus causing clutch disengagement.

I have previously described the mounting of the spring 24 with respect to the arm 22 and the tendency of the spring yieldably to actuate the gear to assure that the arm 22 shall not be accidentally displaced from the gear-shifting position by the counter influence of the plate 65 under the actuating force of the spring 79. The tension of the spring 24 is made strong enough effectively to counterbalance any such action of the spring 79. If the operator, however, wishes to disengage the clutch without disengaging the gear and makes the sight movement of the gear-shifting lever toward the neutral position, as above described for that purpose, the lever will remain at the limit of its above-described free movement so that the clutch will remain out of engagement notwithstanding the tendency of the spring 24 to return the arm 22 in the opposite direction since the friction of the arm 22 against the inner side of the slot 67 or 68, toward which the spring 24 tends to force it, is sufficient to hold the gear-shifting lever in the position to which it has been moved by such slight manipulation without need for the operator to hold it there.

I shall now proceed to the description of my means for regulating the return of the piston 33 thereby controlling the speed of engagement of the clutch, or timing its engagement with respect to throttle operation. The front end of the cylinder 32 (see Fig. 12) is provided with an integral boss 90 which is bored to form a bearing for the piston rod 34. On the underside of the boss 90 is a dependent integral boss 91 which has screwed into a cavity in its base the top of a dash-pot means comprising an hydraulic cylinder 92 provided with a piston assembly 93, the piston rod 94 of which passes upward through a bore in the lug 91 and carries upon its top a ball 95. The piston 34 has a cut away portion on its under side above the cylinder 92 which cut away portion has a flat surface 96 and sloping surfaces 97 and 98. A washer 99 between the top of the cylinder 92 and the base of the cavity in the bottom of the lug 91 closely embraces the piston rod 94 and prevents leakage of the hydraulic fluid for which I preferably use such a composition as is commonly used for a hydraulic brake fluid. With such fluid the cylinder 92 is filled by removal of the filler capscrew 99a which controls a passage from the exterior to the interior of the cylinder 92.

A rectangular passage 100 extending upward through the piston 93 and the piston rod 94 connects the chambers on each side of the piston 93. The passage 100 is controlled and closed on the downward movement of said piston by a ball check valve 101 within an enlarged part of the passage 100 located in the lower end of piston rod 94. The ball check valve 101 is yieldably seated so as to close the passage 100 by means of the coil spring 102. A second coil spring 103 is compressed between the case of the cylinder 92 and the under side of the piston 92 so that it at all times tends to force the said piston upward so as to bring the ball 95 on the top of the piston rod 94 into engagement with the piston rod 34; the by-passing of the fluid through the passage 100 freely permitting such upward movement.

A second by-passing passage 104, to permit downward movement of the piston 93 when the passage 100 will be closed by the ball valve 101, is provided in the side of the cylinder 92. This passage 104 is controlled by a rotary cylindrical valve 105 which has a diametrically cut away portion 105a affording a valve passage. The angular position of the cylindrical valve 105 is controlled by the valve control arm 106 attached thereto, which arm is controlled by a wire cable 107 attached at one end to the upper part of the valve control arm and, at the other end to the throttle valve control rod 16, (see Figs. 1, 4 and 5) which passes through a block 108 clamped thereon by the set-screw 109, which block 108 has slidably mounted therein the U shaped member 110, the position of which may be regulated longitudinally with respect to the block 108 by means of the nut 111 which screws upon the upper threaded end of the U shaped member 110 and bears against the forward side of the block 108. The cable 107 is kept taut by the coil spring 112 (see Figs. 1 and 2) attached at one end to the top of the valve control arm 106 and at its other end to the exterior of the cylinder 32. It will be readily understood, therefore, that the spring 112 yieldably maintains the throttle valve control system at the limit of its rearward position, where it establishes an idling accelerator, until the throttle pedal 13 is depressed. Hence by turning the adjusting nut 111 and shifting the position of the U shaped member 110 with respect to the block 108 the setting of the valve 105 may be effected and its position so adjusted that when the throttle is fully retarded the valve 105 may be partly or wholly opened, or closed to an extent such that a considerable advancement of the throttle control rod 16 is necessary to bring about such rotation of the valve 105 as will bring the valve passage into registration with the passage 104 on both sides of said valve thereby permitting the by-passing of fluid around the piston 93.

It will be readily understood that the by-passing fluid through passage 104 is necessary if the piston 93 is to move downward, since in this direction of movement the passage 100 is closed by the ball valve 101, and the piston 93 must move downward when so forced by contact of the ball 95 with slanting surface 98 on the piston rod 34 when said piston rod is moving forward, to permit clutch engagement, unless said downward movement is checked by a closed condition of the by-pass passage 104 which will prevent the transfer of fluid from beneath the piston 93 to the chamber above it. Hence it will be apparent that the return of the clutch into operative engagement may be stopped definitely and abruptly when the ball 95 encounters the surface 98, provided the valve 105 is closed, or the valve 105 may be so adjusted as to be slightly opened when its control arm 106 is in the extreme of its backward position so that the fluid will by-pass slowly through said valve and permit the surface 98 to pass slowly over the ball 95 to permit final engagement of the clutch in a gradual manner quite independently of any opening movement of the valve 105 in response to movement of its control arm 106 occasioned by advancement of the accelerator pedal. As I have previously explained the opening of the valve 105 may be variously timed with respect to motor acceleration through use of the foot throttle control, so it is quite apparent that in the several ways described the return of this clutch into engagement may be variously adjusted and controlled with or without reference to motor acceleration. It is apparent however that the more abruptly and fully the motor is accelerated the more quickly the clutch will be returned to its position of engagement when it has been wholly or partly checked by the total or partial closure of the passage 104 by the setting of the valve 105, when in its normal position of rest. It is to be noted, however, that the ultimate outward movement of the piston rod 34 is inevitably somewhat retarded, even when valve 105 is open, as the ball 95 and the piston 93 meets the yielding resistance of the coil spring 103 and the inevitably slight resistance incidental to the transfer of liquid from beneath the piston 93 to above it. Hence the clutch can never become over-violently engaged so as to put too severe a stress upon the motor and driven parts.

Of course it will be readily understood that the limit of outward or forward movement of the piston 34 may be initially adjusted to such a position that its sloping surface 98 of the cut away portion thereof will contact the ball 95 as the clutch is very close to its position of rest at the point of firm engagement. Means for such adjustment will obviously be found in varying the length of the connecting link 35, which may be made adjustable as to length by means of the turnbuckle 35a, or the angular setting of the extension arm 12 of the clutch control arm may be made adjustable. I do not attempt to specify as desirable or ideal any state of adjustment of my specified adjustable means for controlling the return of the clutch into engagement, as it is plain that in practice many different conditions are encountered, such as variations in weight and power of cars, type and conditions of clutch, and driving habits of the operator of a particular car. I point out, however, that I have provided means for variously effecting the control of the movement of the clutch into engagement such that such movement may be closely regulated to meet the need for smooth clutch operation under a great variety of conditions.

It will be readily apparent from the foregoing that my device not only adds greatly to the convenience of driving an automobile by eliminating the need of clutch pedal operation by the driver when shifting gears, and upon other necessary occasions when a slight movement of the gearshift lever will suffice to disengage the clutch, but also serves to ensure a proper clutch engagement on the many occasions when even a skilled and careful driver will inadvertently place undue stress upon the motor and power transmission elements of the automobile by too abruptly permitting clutch engagement in the presence of considerable engine speed. Thus the fallible human element is largely eliminated from clutch control incidental to automobile operation thereby affording much protection to many elements of the automobile mechanism by the timely and proper release and engagement of the clutch.

It will be readily understood also that many changes and modifications of my above disclosed means may be made without departing from the principle of operation of my device which is to provide a power operated means for disengaging the clutch the control element of which is governed through that movement of the gear shifting lever which is employed in gear shifting operations, and which is, further, to provide a liquid containing dash-pot means to check and regulate the return movement of mechanism moved initially to effect clutch release, the resistance of which dash-pot means is controlled by means activated by throttle operation.

Although in the form of my invention specifically herein above described I have referred to movement of the gear shifting lever to move gears into or out of meshed relationship, it is to be understood that the operating principle is unchanged when that type of transmission is employed wherein the gears are maintained in mesh and the so-called "gear shifting lever" corresponding to the old conventional type, engages or disengages clutches associated with certain gears to bring about the same effective gear operating results as obtained in the case of the old standard practice, and wherever in the following claims I refer to the "meshing" or "unmeshing" of gears or "gear shifting" I am to be deemed to intend by such language either form of gear operation.

I claim:

1. In a device of the character specified the combination of a gear shifting lever confined to movement in an H-shaped path, power operated means for controlling clutch operation, control means for said power operated means, and means associated with and operated by said gear shifting lever to actuate said control means through the oscillating movement of said lever in a manner whereby the normal movement thereof into position for meshing gears results in clutch engagement and the normal movement thereof into neutral position results in clutch release.

2. In a device of the character specified the combination of a gear shifting lever, a movably mounted member provided with an aperture whereby it may loosely embrace an arm of said gear shifting lever, a spring operated means adapted yieldably to hold said movably mounted member in a position such that said arm may contact therewith and move the same against the resistance of said spring operated means as it approaches the extremity of its forward and backward limits of movement, power operated means for controlling clutch operation, control means for said power operated means, and means connecting said movably mounted member and said control means whereby movement of said movably mounted member by said gear shifting lever arm for placing gears in mesh will influence said control means to cause clutch engagement, and movement thereof toward neutral position will influence said control means to cause clutch release.

3. In a device of the character specified the combination of a gear shifting lever, a movably mounted member provided with an aperture whereby it may loosely embrace an arm of said gear shifting lever, a spring operated means adapted yieldably to hold said movably mounted member in a position such that said arm may contact therewith and move the same against the resistance of said spring operated means as it approaches the extremity of its forward and backward limits of movement, and adapted to actuate said movably mounted member toward, and yieldably maintains it in, a predetermined position such as to set the control means for the power operated means for controlling the clutch in position causing clutch disengagement power operated means for controlling clutch operation, control means for said power operated means, and means connecting said movably mounted member and said control means whereby movement of said movably mounted member by said gear shifting lever arm for placing gears in mesh will influence said control means to cause clutch engagement, and movement thereof toward neutral position will influence said control means to cause clutch release.

4. In a device of the character specified the combination of a gear shifting lever, a slidably mounted plate provided with means for engaging and shifting a gear and provided also with a recess into which the lower arm of the gear shifting lever may enter to engage said plate and move the same, said recess being of size sufficient to permit some free movement of said arm therein, a spring operated means adapted yieldably to hold said movably mounted member in a position such that said arm may contact therewith and move the same against the resistance of said spring operated means as it approaches the extremity of its forward and backward limits of movement, and adapted to actuate said movably mounted member toward, and yieldably maintains it in, a predetermined position such as to set the control means for the power operated means for controlling the clutch in position causing clutch disengagement, power operated means for controlling clutch operation, control means for said power operated means, and means connecting said movably mounted member and said control means whereby movement of said movably mounted member by said gear shifting lever arm for placing gears in mesh will influence said control means to cause clutch engagement, and movement thereof toward neutral position will influence said control means to cause clutch release.

5. In a device of the character specified, the combination of a gear shifting lever having an H-shaped movement, said lever being pivotally fulcrumed at a fixed point on the vehicle chassis, power operated means for disengaging the clutch including a conduit leading to the intake manifold, a control valve in said conduit normally maintained in position to provide a free communication through said conduit from the intake manifold to the power operated means, said valve being maintained in such normal position while the gear shifting lever is in neutral position, and means operable by the gear shifting lever after said lever has been moved to shift the gears to move said valve in either direction from its normal position, said valve being provided with means when moved from its normal position to admit atmospheric pressure to the conduit between said valve and the power operated means to permit engagement of the clutch.

6. In a device of the character specified, the combination of a gear shifting lever pivotally fulcrumed at a fixed point on the vehicle chassis, power operated means for disengaging the clutch, control means for bringing said power-operated means into operation, and means associated with and operated by said gear shifting lever to actuate said control means with the lever in neutral position to disengage the clutch and to release said power-operated means and permit clutch engagement as the gear shifting lever is moved to its final position after shifting the gears, the movement of said gear shifting lever being confined to a path having the shape of the letter H.

HAROLD E. CLARKE.